UNITED STATES PATENT OFFICE.

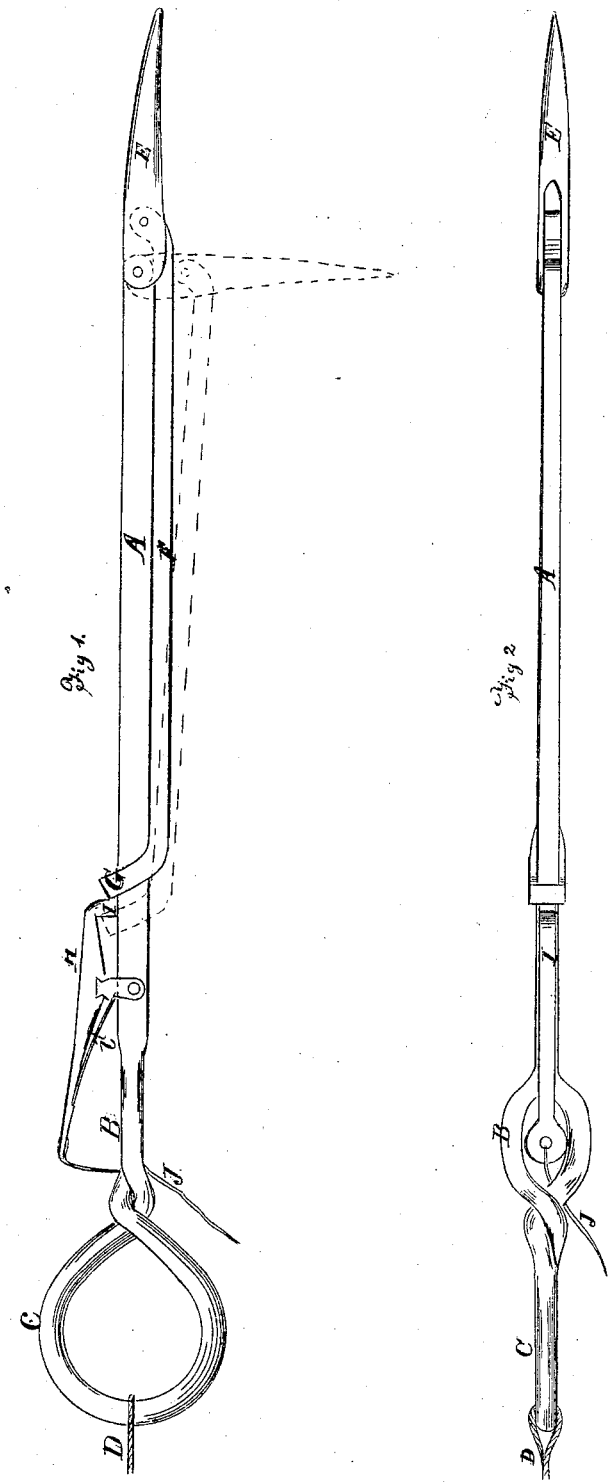

FREDERICK NISHWITZ, OF WILLIAMSBURG, NEW YORK.

IMPROVEMENT IN HORSE HAY-FORKS.

Specification forming part of Letters Patent No. 56,439, dated July 17, 1866.

*To all whom it may concern:*

Be it known that I, FREDERICK NISHWITZ, of Williamsburg, in the county of Kings and State of New York, have invented a new and useful Improvement in Horse Hay-Forks, of which the following is a full, clear, and exact description, reference being had to the accompanying drawings, which make part of this specification, and in which—

Figure 1 represents a view in elevation, of my improved fork, and Fig. 2 a similar view of the same at a right angle with the former one.

My invention relates to that class of horse hay-forks in which the tines or prongs are rigidly held in line with the shank while being driven into the stack, and are then flexed at an angle with the shank, so as to compress a bundle of hay in the angle thus formed between the tine and the shank, when the tine is locked in this position and the bundle lifted and moved. It is then dropped by releasing the tine, which resumes its position in line with the shank and is locked in that position for a repetition of the operation.

The improvement herein claimed consists, first, in combining the shank or draw-bar and the pivoted tine or prong with the traversing bar and locking-lever by means of a loop or collar on the traversing bar embracing the shank, so as to steady the traversing bar and at the same time serve in locking the tine in either of its two positions; second, in combining with the shank and the looped traversing bar a locking lever or bolt which locks the traversing bar to render the tine rigid while entering the hay, and also locks it securely when the tine is flexed.

This combination and arrangement of parts is simple, cheap, and effective, and dispenses with the complexity of parts employed, and renders unnecessary the nicety of adjustment of such parts requisite in the forks of this class hitherto patented.

In the accompanying drawings, the shank A carries at its top a twisted loop or eye, C, for the draw-rope D, and near its upper end and at right angles with the eye C is an eye for the latch-rope or trip-cord J. The shank may be either round or square, the collar on the traversing bar being made comformable.

A prong or tine, E, is pivoted to play vertically in the lower end of the shank, and is also pivoted in a similar manner to the lower end of the traversing bar F, as will be seen in the drawings, Fig. 1, while a collar or loop, G, formed on the upper end of the bar F, encircles and slides upon the corresponding part of the shank A, which is thus connected with the traversing bar at each end.

The collar or loop G is represented in the drawings as inclined at a slight angle, so as to better afford a catching-edge both on its upper and lower sides for engaging the locking-lever H at either extremity of its play in operating the fork. It is obvious, however, that this inclination is not essential.

The locking-lever H is pivoted to play vertically on the shank A with the eye for the detaching-rope in its upper end opposite to or connecting with the eye B in the shank. The lower end of this lever forms a blunt nose, I, the lower side of which locks the upper side of the collar G when the tine is vertical, while the upper side locks the lower side of the collar when the tine is flexed. A spring, $i$, keeps the nose down upon the shank and collar or permits of its being disengaged, as required, by pulling on the trip-cord J.

In operation, (the parts occupying the position shown by the full lines in the drawings,) the fork is forced into the hay to a sufficient depth. The nose I is then raised by pulling on the draw-rope J. This releases the collar G and allows the tine E to flex, the loop G on the traversing bar sliding up the shank and bringing the parts into the position shown by the dotted lines in Fig. 1, where, the trip-cord being now slacked, it is securely held by the nose of the locking-lever below the collar. The bundle is now hoisted to any desired position in the usual way and tripped by pulling the cord J, which releases the collar and allows it to slide down the shank and the tine to swing into the perpendicular again, when the hay drops. The fork is then lowered, and the above-described process may be repeated. More than one tine may be used, if desired.

What I claim as my invention, and desire to secure by Letters Patent, is—

1. The combination, with the shank, the tine, and the traversing bar, of the sliding collar G, all arranged and operating substantially as described.

2. The combination, with the shank and traversing bar, of the locking-lever, when constructed and arranged as and for the purpose described.

In testimony whereof I have hereunto subscribed my name.

F. NISHWITZ.

Witnesses:
 HENRY A. LEE,
 JACOB WERTZ.